United States Patent
Niki et al.

(10) Patent No.: US 7,473,356 B2
(45) Date of Patent: Jan. 6, 2009

(54) WASTEWATER TREATMENT SYSTEM BY SUPERCONDUCTING MAGNETIC SEPARATION

(75) Inventors: Takefumi Niki, Takaishi (JP); Yasuhiro Noda, Higashiosaka (JP); Tatsuo Fukunishi, Osaka (JP)

(73) Assignees: Niki Glass Co., Ltd, Osaka (JP); Tatsumi Air Engineering, Ltd, Osaka (JP); Futaba Shoj, Co., Ltd, Osaka (JP)

( * ) Notice: Subject to any disclaimer, the term of this patent is extended or adjusted under 35 U.S.C. 154(b) by 523 days.

(21) Appl. No.: 10/523,245

(22) PCT Filed: Aug. 5, 2004

(86) PCT No.: PCT/JP2004/011586

§ 371 (c)(1),
(2), (4) Date: Jan. 27, 2005

(87) PCT Pub. No.: WO2005/014486

PCT Pub. Date: Feb. 17, 2005

(65) Prior Publication Data

US 2006/0037914 A1    Feb. 23, 2006

(30) Foreign Application Priority Data

Aug. 7, 2003  (JP) ............................. 2003-288440

(51) Int. Cl.
*C02F 1/48* (2006.01)

(52) U.S. Cl. ..................... 210/223; 210/222; 210/275; 210/409; 210/411; 210/695; 210/791; 209/223.1; 209/232

(58) Field of Classification Search ................. 210/222, 210/223, 411, 695, 791, 275, 409; 209/223.1, 209/232
See application file for complete search history.

(56) References Cited

U.S. PATENT DOCUMENTS 4,054,513 A * 10/1977 Windle ........................ 210/222

FOREIGN PATENT DOCUMENTS

| JP | 53-007966 | 1/1978 |
|---|---|---|
| JP | 60-058216 | 4/1985 |
| JP | 7-108292 | 4/1995 |
| JP | 10-211428 | 8/1998 |
| JP | 2000-117142 | 4/2000 |
| JP | 2001-300507 | 10/2001 |
| JP | 2002-028406 | 1/2002 |
| JP | 2003-001243 | 1/2003 |

OTHER PUBLICATIONS

Translation of the Detailed Description of JP 10-211428.*
Translation of the Detailed Description of JP 2000-117142.*
Translation of the Detailed Description JP 2003-001243.*

* cited by examiner

*Primary Examiner*—David A Reifsnyder
(74) *Attorney, Agent, or Firm*—Allen, Dyer, Doppelt, Milbrath & Gilchrist, P.A.

(57) ABSTRACT

An object of the invention is to provide a wastewater treatment system using a superconducting magnetic separator that can wash the magnetic filter efficiently. The system comprises in a bore of a superconducting magnet a removably built-up multiunit magnetic filter consisting of a plurality of single-unit magnetic filters. The multiunit magnetic filter has a total longitudinal length at least equal or greater than that of the superconducting magnet. During excitation of the superconducting magnet, a single-unit magnetic filter is removed from the upstream side (sewage side) of the multiunit magnetic filter by pushing in another single-unit magnetic filter from the downstream side (clean water side), and washed and returned to the downstream side again.

5 Claims, 8 Drawing Sheets

WASTEWATER TREATMENT SYSTEM BY SUPERCONDUCTING MAGNETIC SEPARATION

TECHNICAL FIELD

The invention relates to a wastewater treatment system by superconducting magnetic separation, and more particularly to a wastewater treatment system for purifying wastewater using a solenoid-type superconducting magnetic separator.

The term "wastewater treatment" used herein also includes advanced or high-level purification treatment at a water purification plant, and advanced treatment of underground water, river water, seawater or the like. The term "wastewater" used herein means not only wastewater or water discharged from various types of factories, experimental facilities, laboratories, school plants, household facilities, etc. but also underground water, river water, seawater, water to be treated by a water purification plant or sewage treatment plant and the like, i.e., it broadly means "water including materials to be separated".

BACKGROUND ART

The wastewater from factories etc. includes various types of materials to be separated from the wastewater from the viewpoints of environmental protection and recycling of resources. For example, wastewater discharged from a recycled paper manufacturing plant may include many materials to be separated such as dye and pigment contained in used paper, organic matter contained in adhesive, and coagulant added during conventional wastewater treatment. Since these substances are causative agents that raise COD (Chemical Oxygen Demand), the discharge of such substances has been strictly regulated recently for environmental protection. Similarly, with reference to not only the index of COD, but also indexes of BOD (Biochemical Oxygen Demand) and TOC (Total Organic Carbon), the discharge of causative agents that raise these indexes should be regulated from the viewpoint of environmental conservation.

In conventional wastewater treatment, after normal treatment using coagulant, biological treatment is performed using activated sludge. Specifically, organic matter contained in the wastewater is degraded by a variety of bacterium or aggregations of organisms (activated sludge) and then discharged.

The prior art documents related to the invention of the patent application include for example the following: Japanese Patent Publication No. 2002-292565; Japanese Patent Publication No. 2002-210311; Japanese Patent Publication No. 2002-180101; Japanese Patent Publication No. 2002-292305; Japanese Patent Publication No. 2002-316068; Japanese Patent Publication No. 2002-316069; and Japanese Patent Publication No. 2002-316067.

DISCLOSURE OF THE INVENTION (Problems to be Solved by the Invention)

The conventional biological treatment using activated sludge involves problems that large-scale facilities and vast installation area are required because of slow throughput speed of the biological treatment, and that sophisticated skills are needed to control the conditions for efficiently utilizing the activated sludge.

The object of the invention is therefore to provide a wastewater treatment system that can solve the above-mentioned problems involved in the wastewater treatment by the activated sludge and that can achieve advanced treatment with low cost, small space, high efficiency and high speed.

Moreover, in a conventional general-purpose superconducting magnetic separator, in order to wash a magnetic filter, the superconducting magnet has to be stopped for a time to backwash the magnetic filter or to remove, wash and re-mount the filter, and then the magnet must be excited again. As the result, it is very inefficient in point of time, cost and operation.

Another object of the invention is therefore to provide a wastewater treatment system using a superconducting magnetic separator in which a magnetic filter can be washed efficiently.

(Means for Solving the Problems)

To solve the above-mentioned problems, the invention provides a wastewater treatment system, wherein magnetism is added to material to be separated, and then the material is separated from wastewater by a solenoid-type superconducting magnet, characterized in that said addition of magnetism to the material to be separated is performed by attaching the material to magnetism-seeded porous material, activated carbon or carrier used as sorption agent.

The superconducting magnetic separator used in the wastewater treatment system according to the invention may comprises in a bore of the superconducting magnet a removably built-up multiunit (or multistage) magnetic filter consisting of a plurality of single-unit magnetic filters, the multiunit magnetic filter having the total longitudinal length at least equal or greater than that of the superconducting magnet. Such structure leads to an advantage that it is possible to remove a single-unit magnetic filter from the upstream side (sewage side) of the multiunit magnetic filter by pushing in another single-unit magnetic filter from the downstream side (clean water side), and to wash and return the removed filter to the downstream side again even during excitation of the superconducting magnet.

The system may be configured in such a way that magnetism is added to the material to be separated in wastewater by attaching the material to a magnetic sorption agent in a treatment tank under the action of sorption, and that the magnetic filters are washed in the same treatment tank, so that the sorption agent attached to the magnetic filters can by released and returned directly to the treatment tank. In such configuration, microorganism-adhered carrier such as biological activated carbon may also be used as sorption agent. Such purification of wastewater by biodegradation using microorganism-adhered carrier is also referred to as "wastewater treatment by microorganism immobilization method".

Moreover, the superconducting magnetic separator used in the wastewater treatment system according to the invention may comprise a pair of magnetic filters connected to each other and movable in a longitudinal direction through the bore of the superconducting magnet in order to switch the magnetic filter for alternate use, so that while one magnetic filter is used for magnetic separation in the bore, the other magnetic filter can be backwashed outside the bore.

(Advantages of the Invention)

Thanks to the embodiment of the wastewater treatment system comprising a magnetism adding means for adding magnetism to material to be separated, and a solenoid-type superconducting magnetic separation means for collecting and separating the magnetism-added material by the magnetic field generated by the solenoid-type superconducting magnet, characterized in that said magnetism adding means adds magnetism to the material to be separated by attaching the material to magnetism-seeded porous material, activated carbon or carrier used as sorption agent, many advantages are gained such as very low cost of facilities, small space, simple operationality, high speed treatment, high efficiency, and advanced treatment, compared to the prior art. Additionally, the magnetic sorption agent can be recovered, regenerated and reused, which improves the efficiency and cost performance of the system.

Moreover, the removably built-up multiunit magnetic filter consisting of a plurality of single-unit magnetic filters is provided in a bore of the superconducting magnet and the multiunit magnetic filter has the longitudinal length at least equal or greater than that of the superconducting magnet; so that it is easy to remove sequentially single-unit magnetic filters from the upstream side by pushing in clean single-unit magnetic filters in sequence from the downstream side, and to wash and return the removed single-unit filters to the downstream side, without reducing the magnetic field even during excitation of the superconducting magnet.

More detailed explanation on its operational principle is given below. Essentially, it is the most stable condition that the longitudinal center of the multiunit magnetic filter is positioned at the longitudinal center of the magnetic field generated by the superconducting magnet. Accordingly, if the multiunit magnetic filter in such most stable condition is made to be moved slightly longitudinally, it is strongly pulled back to the center of the magnetic field. Even in this condition, if one single-unit magnetic filter is pushed in from the downstream side, the multiunit magnetic filter is lengthened at the downstream side and the longitudinal center of the multiunit filter is shifted towards the downstream side; thus, pulling force is generated to pull the filter towards the upstream side for achieving more stable condition. As the result, a single-unit magnetic filter is pushed out towards the upstream side, which makes it easy to remove it from the multiunit magnetic filter.

Moreover, according to another embodiment, single-unit magnetic filters removed from the upstream side of the multiunit magnetic filter are washed by an ultrasonic cleaning apparatus or the like in the treatment tank so as to return the magnetic sorption agent directly to the treatment tank; thus, the sorption agent can be efficiently recovered, regenerated and reused.

Furthermore, according to another embodiment, microorganism-adhered magnetic carrier such as biological activated carbon is used as sorption agent and is kept in the tank without taking out sludge to the outside of the tank, so that both the functions of adsorption and biodegradation can be utilized. Thus, higher speed and advanced treatment is achieved at high efficiency and low cost. Further, the microorganisms attached to the surface of the biological activated carbon also degrade the organic matter with which the pores on the surface of the activated carbon are clogged, and regenerate the performance of adsorption or absorption of the activated carbon. Thus, the frequency of replacement of the activated carbon can be reduced.

Moreover, according to another embodiment of the system configured in such a way that a pair of magnetic filters connected to each other and movable longitudinally is disposed in a bore of a superconducting magnet so that while one magnetic filter is positioned in the bore for wastewater treatment, the other magnetic filter may be backwashed outside the bore (switchback type), the wastewater treatment can be performed without time loss required for switching the magnetic filter, and it is unnecessary to provide a mechanism for removing a single-unit magnetic filter from the upstream side, washing and returning it to the downstream side. Further, the switchback-type magnetic filter is disposed in a closed container; thus, even if bacterium such as *Escherichia coli* O157 and/or toxic substances such as endocrine disrupting chemicals are captured, it is possible to perform necessary treatment in the tank and take out them without spreading.

BRIEF DESCRIPTION OF THE DRAWINGS

The invention is described below with reference to the drawings:

FIG. 5 is a schematic illustration of a single-unit magnetic filter, where FIG. 5(a) is a front view and FIG. 5(b) is a sectional view taken along line B-B' in FIG. 5(a);

BEST MODE FOR CARRYING OUT THE INVENTION

The wastewater treatment system according to the invention comprises a magnetism adding means for adding magnetism to material to be separated, and a superconducting magnetic separation means for separating the material from wastewater by collecting the magnetism-added material by the magnetic field generated by a solenoid-type superconducting magnet.

Only the magnetism-added material to be separated in wastewater flowing axially in a solenoid-type superconducting magnet may be attached to the wall in the magnet bore by magnetic field generated by the superconducting magnet. Such magnetic separator using an air-core solenoidal magnet with no magnetic material disposed in the magnetic field is also referred to as "open-type filter system".

The wastewater treated by the invention includes but not limited to the wastewater from various factories such as paper mill, food products factory, semiconductor factory, chemical products factory, dye works, plating factory. For example, wastewater made in daily life, wastewater discharged from a school plant or laboratory, etc. may also be treated. The term "wastewater" used in the specification may also include, for example, river water, underground water, etc. Such wastewater is collected and purified by a sewage treatment plant or water purification plant. Thus, the purification treatment by the water purification plant is also included in the "wastewater treatment" used in the specification.

The material to be separated from wastewater may includes a variety of materials, for example, dye, pigment, adhesive, cellulose, coagulant, etc. (substances causing the rise of COD) contained in the wastewater discharged from a paper mill, recycled paper manufacturing plant, etc., inorganic substances such as SiC and $SiO_2$ contained in waste fluid discharged from a semiconductor factory, nonmagnetic substances including biological material such as blue-green algae, heavy oil, metal ion and the like. These materials are solely cited as an example, and should not be limited thereto. The material to be separated may also include, for example, *Escherichia coli* 0157, endocrine disrupting chemicals and the like.

The addition of magnetism (or magnetization) to the material to be separated (referred to as "magnetic seeding") may be performed by, for example, a colloid chemical magnetic seeding method, a mechanochemical magnetic seeding method, an electrochemical magnetic seeding method, etc. In the colloid chemical magnetic seeding method, for example, colloid of iron oxide is attached to the material to be separated by ol-dization or oxo-dization, or the material to be separated is oxidized by precipitation or coprecipitation of iron hydroxide. In the mechanochemical magnetic seeding method, magnetic substance such as iron chip is mechanically attached to the material to be separated.

Alternatively, magnetism may be seeded to the sorption agent in advance by a colloid chemical magnetic seeding method, a mechanochemical magnetic seeding method, an electrochemical magnetic seeding method or the like, and then magnetism may be added to the material to be separated, by sorption (i.e. adsorption and/or absorption) of the material to the sorption agent. The sorption agent may include magnetite, ceramic porous material, zeolite porous material, activated carbon, plastic carrier, etc. Making sorption agent as porous material leads to high efficiency of adsorption and/or absorption.

The superconducting magnetic separation means according to the invention may be configured in such a way that magnetic fine wires are disposed in the magnetic field to generate high gradient magnetic field (closed filter type). The magnetism-added material in wastewater is attached to the magnetic fine wires under the action of this high gradient magnetic field. In this manner, the magnetic fine wires disposed in the magnetic field make it possible to generate high gradient magnetic field, so that magnetic force acting on the material to be separated is enhanced to achieve more efficient treatment.

A sedimentation tank may be disposed between the magnetism adding means and the magnetic separation means to separate the sedimentary material from the wastewater, which improves the efficiency of separation.

According to another embodiment of closed filter type, the invention may comprises a removably built-up multiunit magnetic filter consisting of a plurality of magnetic filters ("single-unit magnetic filters") made of magnetic material such as magnetic fine wires, the multiunit magnetic filter being disposed in a bore of a superconducting magnet, and having the longitudinal length at least equal or greater than that of the superconducting magnet. Such structure leads to the advantage that it is easy to remove sequentially the single-unit magnetic filters at an upstream side where more material to be separated is captured, by pushing in clean single-unit magnetic filters one by one from a downstream side, and to wash and return the removed filters to the downstream side again, even during excitation of the superconducting magnet (i.e. during generation of magnetic field). This operational principle is described above. This enables continuous treatment without interrupting the magnetic separating treatment for washing the single-unit magnetic filters.

In conventional superconducting magnetic separation, in order to remove the material captured in the magnet, the excited superconducting magnet must be stopped for a time to remove the material, and then be exited again; thus, its efficiency is very low. This is because magnetic filters are strongly held at the center of the magnetic field generated by the superconducting electromagnet during operation of the magnet, so that it is hard to take out the magnetic filters to the outside of the bore of the magnet during its excitation. For this reason, the superconducting magnet has to be stopped for a time to remove, wash and re-mount the magnetic filters, or to backwash the filters disposed in the magnet bore. This shortcoming is overcome by the arrangement of the invention.

The wastewater treatment system according to the invention may further comprise a transfer and wash means configured in such a way that, during excitation of the superconducting magnet, single-unit magnetic filters can be sequentially removed from the upstream side of the multiunit filter by pushing in clean single-unit magnetic filters in sequence from the downstream side of the multiunit filter, and be washed and pushed in from the downstream side again. To wash, any washing method may optionally adopted such as a suction cleaning method of sucking the material attached to the surface of the filter by air suction, a jet washing method of washing the filter by pressurized water, an ultrasonic cleaning method, a bubble cleaning method, and any combination thereof.

Preferably, the transfer and wash means may be configured in such a way that an ultrasonic cleaning apparatus is provided in a treatment tank, the single-unit magnetic filters removed from the upstream side of the multiunit magnetic filter are transferred to the cleaning apparatus in the treatment tank, and attached sorption agent is released and returned directly to the treatment tank. Since the sorption agent such as activated carbon, ceramic porous material, and ceramic or plastic carrier is returned directly to the treatment tank, the sorption agent can be efficiently recovered, regenerated and reused.

In the embodiment where the sorption agent is returned directly to the treatment tank, it is also possible to use microorganism-attached carrier as sorption agent, for example, activated carbon having a surface on which microorganisms are attached (i.e. biological activated carbon). The biological activated carbon has a function of biodegradation as well as a function of adsorption or absorption of the material to be separated; hence, organic matter is degraded in the treatment tank, which improves the performance of clarification with the help of magnetic separation. Additionally, the organic matter with which the pores on the surface of the activated carbon are clogged is degraded by the function of biodegradation of the biological activated carbon to regenerate the activated carbon; thus, the frequency of replacement of the activated carbon can be reduced.

According to another embodiment, instead of the multiunit magnetic filter, a pair of magnetic filters connected to each other and movable in a longitudinal direction through the bore of the superconducting magnet may be utilized for alternate use in such a way that while one magnetic filter is used for wastewater treatment in the bore of the magnet, the other magnetic filter can be backwashed outside the bore (referred to as "switchback type"). Such structure leads to advantages that the wastewater treatment can be performed efficiently without any loss of time, and that it is not required to provide a transfer and wash means for removing single-unit magnetic filters from the upstream side and for washing and returning them to the downstream side. Further, the switchback-type magnetic filter is disposed in a closed container. Thus, even if bacterium such as *Escherichia coli* 0157, toxic substances such as endocrine disrupting chemicals, etc. are captured, it is possible to take out them after necessary treatment without spreading; hence, high safety can be achieved.

EMBODIMENTS

Embodiments of the invention will be described below with reference to the drawings.

Figure 1:
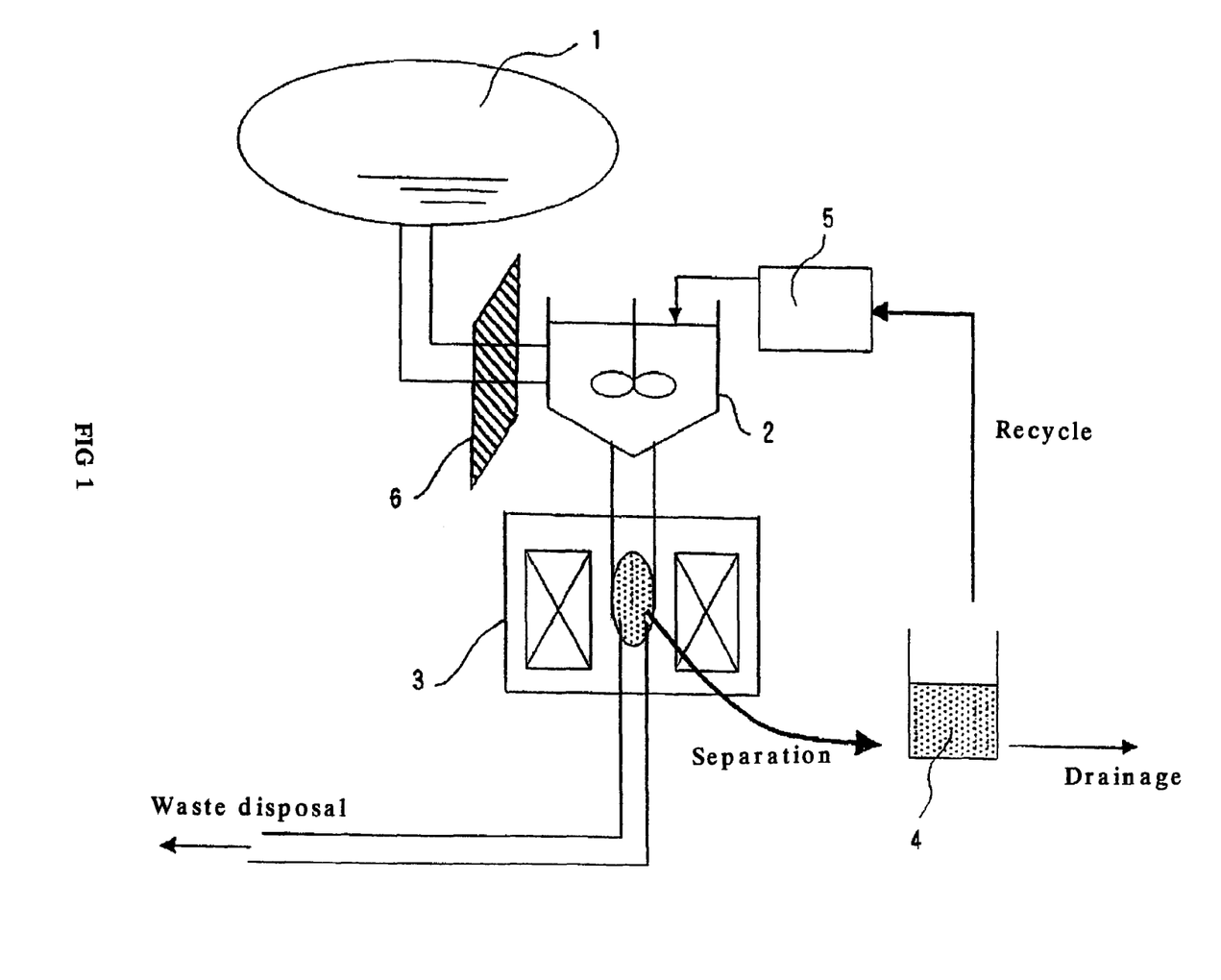
FIG. 1 is a schematic illustration of a wastewater treatment system according to the invention.

FIG. 1 is a schematic illustration of an embodiment of a wastewater treatment system according to the invention. First, wastewater 1 discharged from a factory or the like is passed to a magnetism-adding (or magnetizing or magnetic seeding) apparatus 2 through a filter 6. In the magnetism-adding apparatus 2, magnetism is added to dye, pigment, organic matter contained in adhesive, etc. (i.e. materials to be separated) by attaching them to magnetic sorption agent 5 in the wastewater under the action of sorption during stir. Alternatively, in the magnetism-adding apparatus 2, magnetism may be added or seeded directly to the material by a colloid chemical magnetic seeding method or a mechanochemical magnetic seeding method instead of use of the sorption agent 5.

The wastewater containing the magnetism-added or magnetism-seeded material to be separated is transferred to a superconducting magnetic separator 3, and is passed through the high-strength and high-gradient magnetic field generated by a solenoid-type superconducting magnet. In the case of an open-type filter system having no magnetic fine wires disposed in the magnetic field of the solenoid-type magnet, the magnetism-added material is attached to the pipe wall in the magnet bore. In the case of a closed-type filter system having magnetic fine wires disposed in the magnetic field, the magnetism-added material is attached to the magnetic fine wires. From the material 4 thus separated, the magnetic sorption agent 5 is recovered, regenerated and reused, while the remains are discarded. The separated water is discharged into a sewer or recycled.

Figure 2:
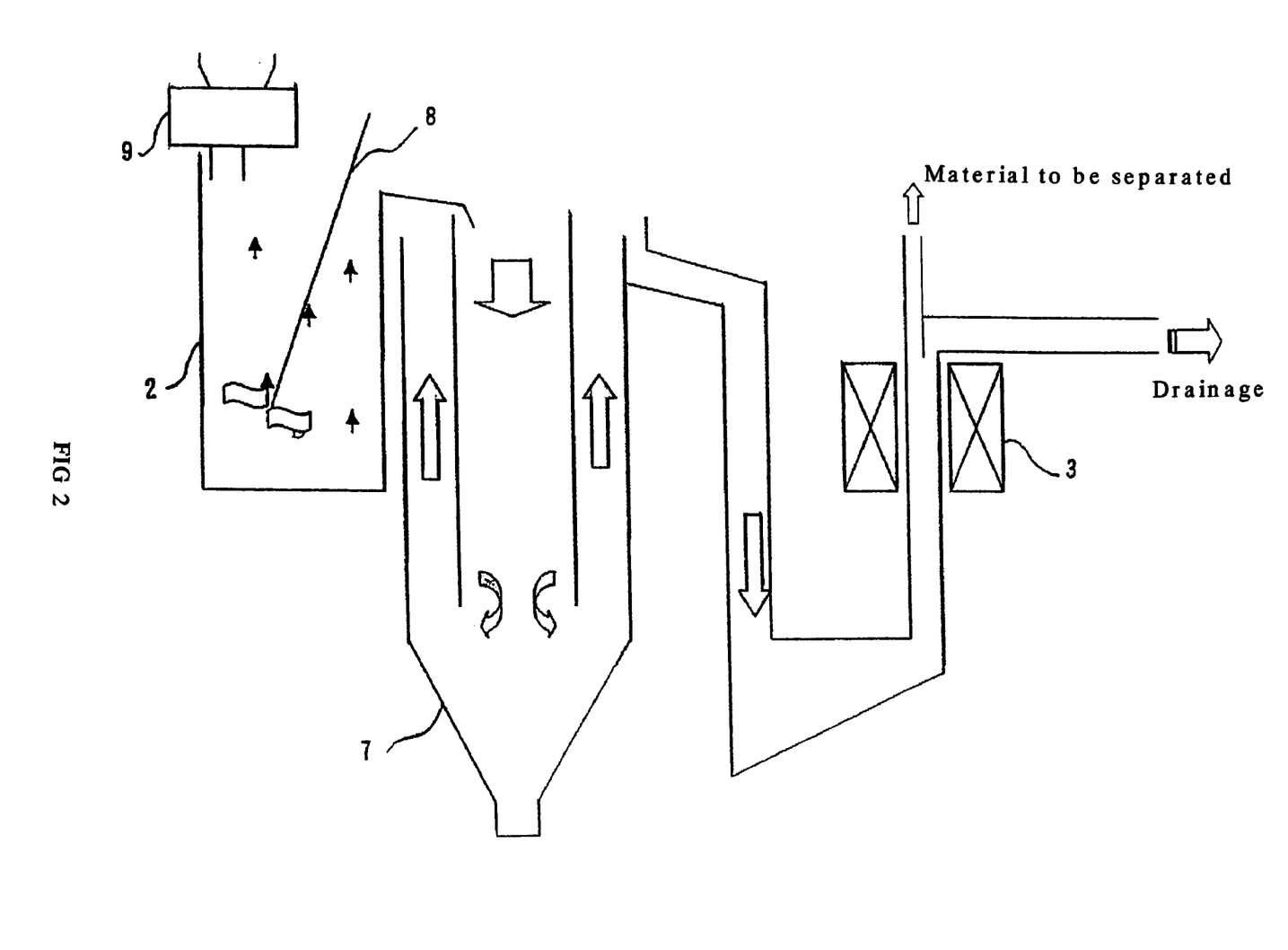
FIG. 2 is a schematic illustration of another embodiment of a wastewater treatment system according to the invention.

FIG. 2 shows another embodiment of the invention. The embodiment differs from that of FIG. 1 in that an additional sedimentation tank 7 is disposed between the magnetism-adding apparatus 2 and the magnetic separator 3. In the sedimentation tank 7, the material to be separated is separated from water by sedimentation of the material.

Figure 3:
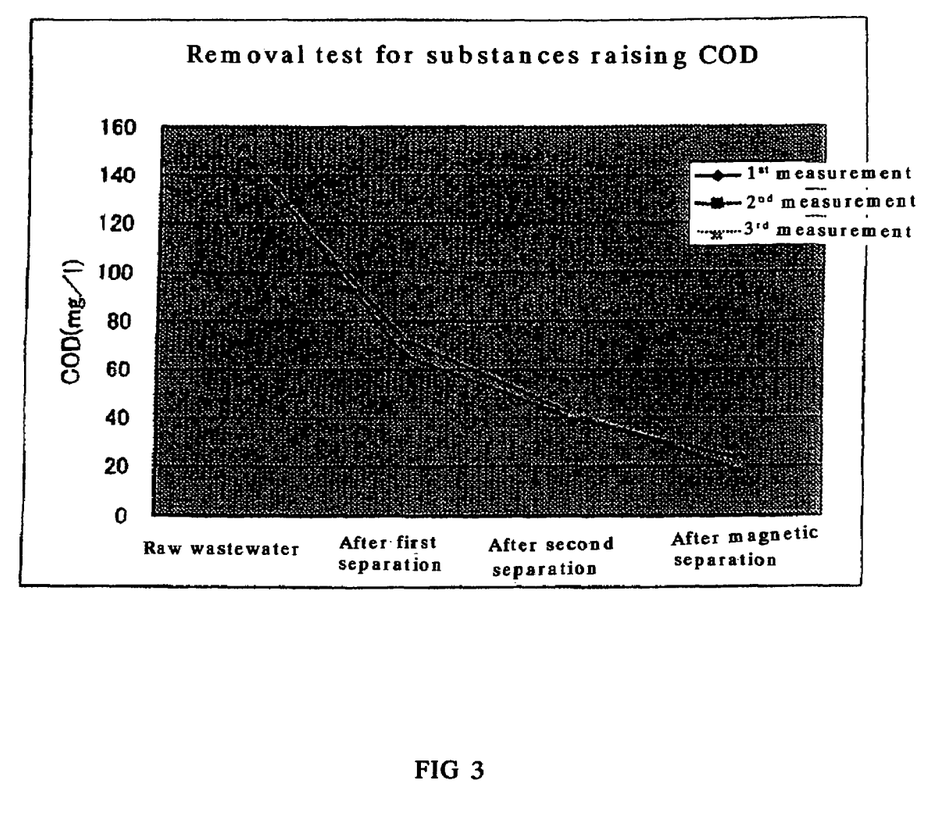
FIG. 3 shows the results of a removable test for substances causing the rise of COD, the test having done by the wastewater treatment system according to the invention.

FIG. 3 shows the results of a removal test for substances causing the rise of COD in wastewater. The test was done by the wastewater treatment system according to the invention. The concentration of the substances causing the rise of COD in the raw wastewater was about 150 mg/l. After the first separation by a pre-filter (indicated by 6 in FIG. 1), the concentration was about 70 mg/l. After the second separation by the sedimentation tank (indicated by 7 in FIG. 2) after addition of magnetism, the concentration was about 40 mg/l. And after magnetic separation (indicated by 3 in FIG. 2), the concentration was about 20 mg/l. Thus, these results indicate good performance of removal by the wastewater treatment system according to the invention.

Figure 4:
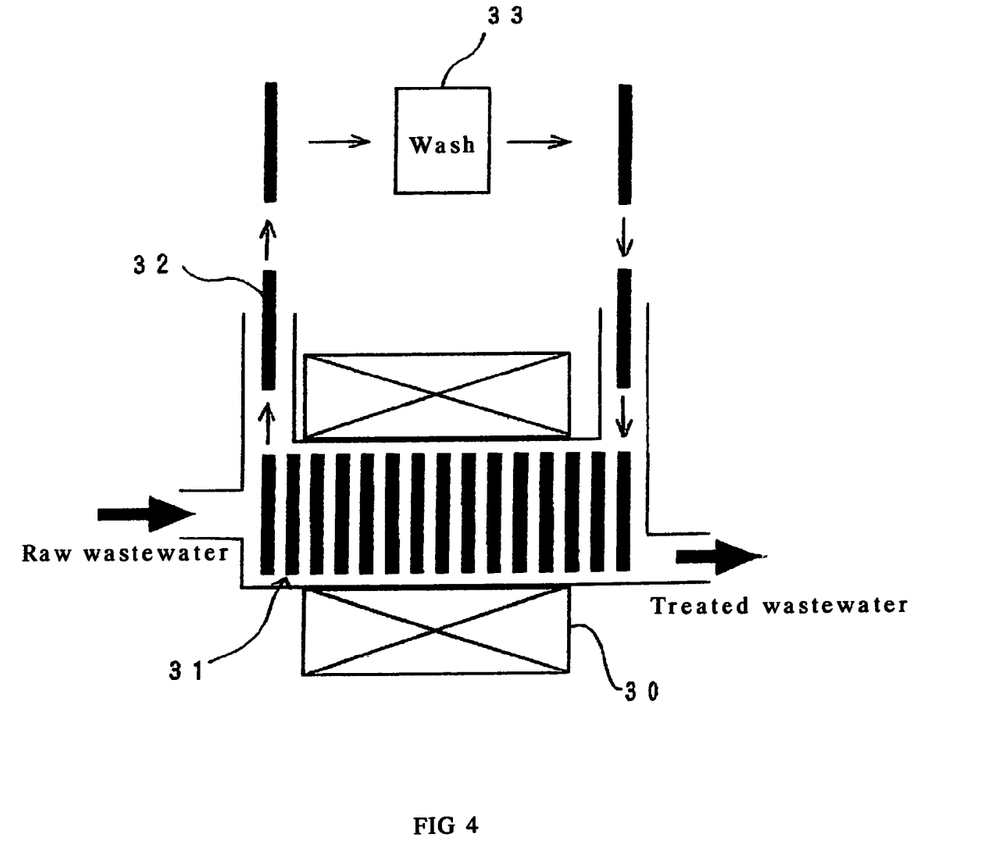
FIG. 4 is a schematic illustration of a multiunit magnetic filter and a transfer and wash apparatus for single-unit magnetic filters, used in the wastewater treatment system according to the invention.

FIG. 4 illustrates the multiunit magnetic filter 31 used in the wastewater treatment system according to the invention, and the manner of washing the single-unit magnetic filters 32 making up the multiunit magnetic filter 31. The multiunit magnetic filter 31 is a removably built-up filter that is composed of a plurality of single-unit magnetic filters 32. The longitudinal length of the multiunit magnetic filter is at least equal or greater than that of the superconducting magnet 30. As described in detail below, as the position of the single-unit magnetic filter approaches the upstream side (wastewater inflow side), the material to be separated is more captured in the multiunit magnetic filter 31. Thus, preferably, single-unit magnetic filters 32 are sequentially removed from the upstream side by pushing in other single-unit magnetic filters 32 in sequence from the downstream side, and are washed and returned to the downstream side. When the single-unit magnetic filter 32 is removed from the upstream side, it is pushed up, for example, in the direction perpendicular to the longitudinal direction of the magnet. For washing, any washing method may be optionally used such as bubble cleaning, ultrasonic cleaning, jet cleaning, suction cleaning and any combination thereof.

The multiunit magnetic filter 31 has a whole longitudinal length at least equal or greater than that of the superconducting magnet 30, which makes it easy to sequentially take out the single-unit magnetic filters 32 from the upstream side by pushing in other single-unit magnetic filters 32 one by one from the downstream side, and to return them to the downstream side after-washing even during excitation of the superconducting magnet 30. This is based on the nature that the most stable condition is achieved when the longitudinal center of the multiunit magnetic filter is positioned at the longitudinal center of the magnetic field of the superconducting magnet. Specifically, when one single-unit magnetic filter is pushed in from the downstream side, the length of the multiunit magnetic filter is extended towards the downstream side and the longitudinal center is shifted towards the downstream side; thus, the multiunit magnetic filter is pulled towards the upstream side for more stable condition. As the result, a single-unit magnetic filter is pushed out at the upstream side, which makes it easy to remove it from the multiunit magnetic filter.

Figure 5:
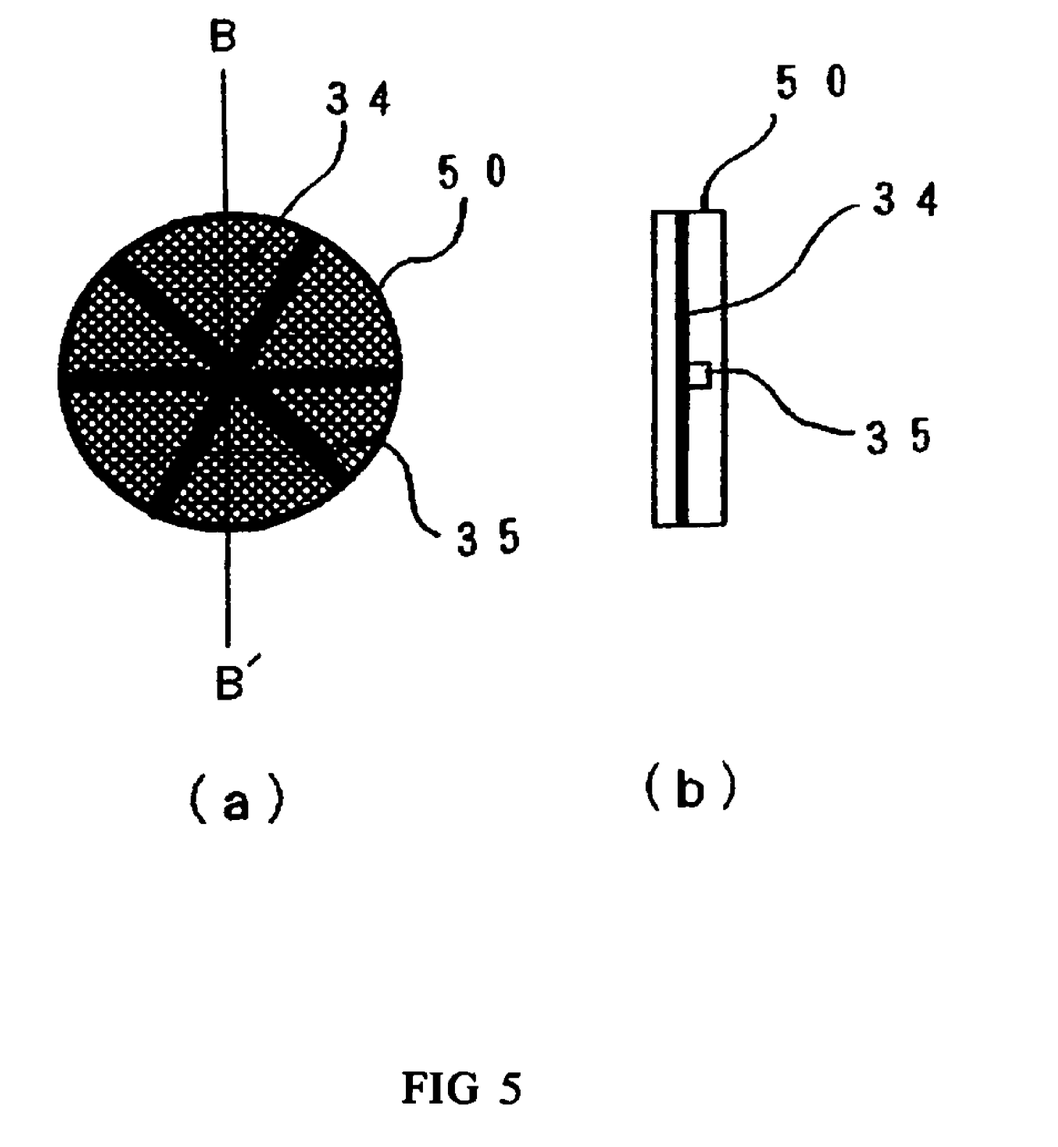

FIG. 5 illustrates as an example one single-unit magnetic filter 32 of the multiunit magnetic filter 31. A wire netting 34 made of magnetic material is set to a filter case 50, and it is supported by supports 35 if necessary. The mesh size of the wire netting 34, the diameter and thickness of the filter may be optionally determined based on the processing object and processing power. The wire netting may be removably set, and/or set in a pile.

Magnetic force is applied to magnetic material such as wire netting 34 to force it to be arranged along the direction of the magnetic field line in the magnetic field. As the result, if one single-unit magnetic filter is placed in the bore of a solenoidal magnet, it will be forced to be laid along the axial direction. Thus, if there is any space between the continuously built-up single-unit magnetic filters 32, the single-unit magnetic filters are forced to be laid, which involves the risk of preventing the close multiunit formation. In order to avoid this, preferably, the axial stability is enhanced by using the filter case 50 made of magnetic material or by fixing proper number of axial rods of magnetic material to the filter case 50 in place.

Figure 6:
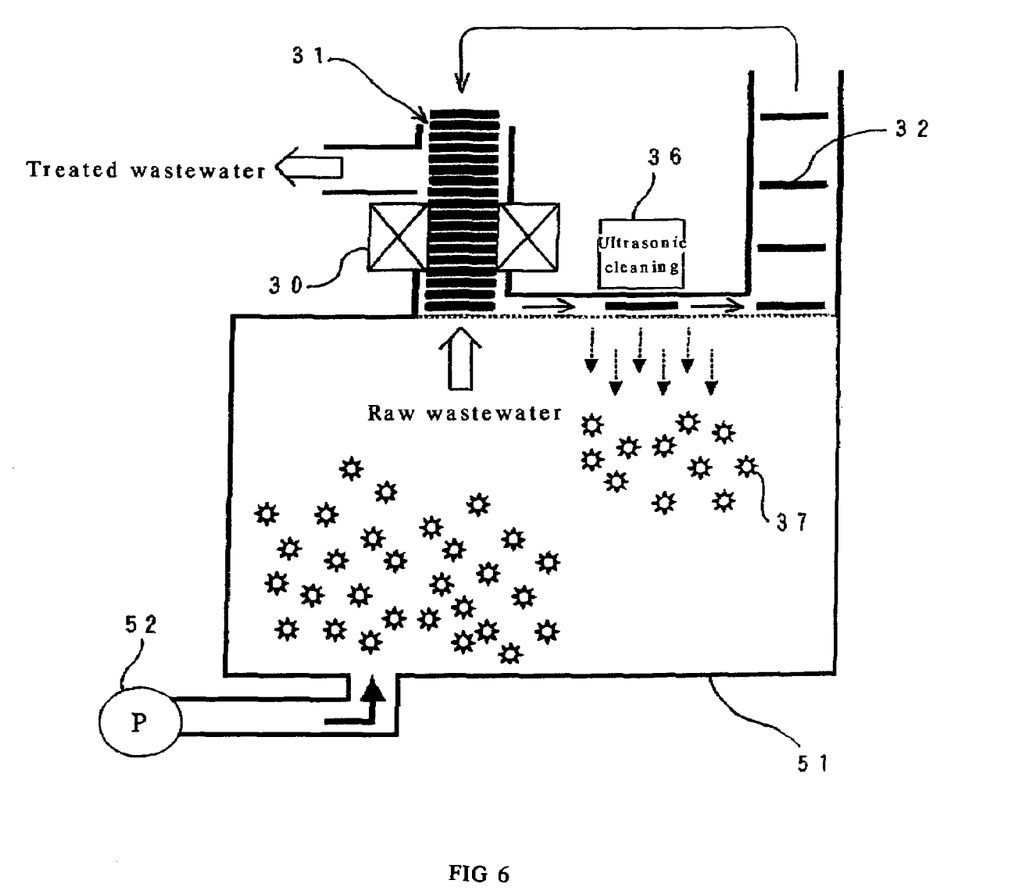
FIG. 6 illustrates the configuration of another embodiment according to the invention, in which sorption agent attached to single-unit magnetic filters are released by an ultrasonic cleaning apparatus in a treatment tank and returned directly to the tank.

With reference to FIG. 6, in the wastewater treatment system using the multiunit magnetic filter 31 according to the invention, the sorption agent 37 such as activated carbon and porous material is released in the treatment tank 51 from the single-unit magnetic filters 32 by an ultrasonic cleaning apparatus 36 and returned directly into the tank (referred to as "sorption agent holding type magnetic filter system"). Since the sorption agent 37 is returned directly to the treatment tank 51, it is easy to recover the sorption agent 37 deposited on the bottom of the treatment tank 51, for example, and to regenerate and reuse them.

In such structure, in case biological activated carbon is used as sorption agent, it is possible to utilize the both of the functions of adsorption carried out by the activated carbon and of biodegradation carried out by microorganism layer formed on the surfaces of the activated carbon particles to purify the water. Thus, organic matter can be removed efficiently by a small amount of activated carbon. The organic matter with which the pores on the surface of the activated carbon are clogged is also subjected to biodegradation to regenerate the activated carbon; thus, the frequency of replacement of the activated carbon can be reduced (for example one time every three years). In such treatment method, the magnetic separation using the multiunit magnetic filter according to the invention is combined with the biodegradation process by biological activated carbon (referred to as "magnetic separation type biological activated carbon treatment method").

On the other hand, in a conventional biological activated carbon treatment method, throughput speed (flow rate) cannot be raised much because it is required to prevent the effluence of activated carbon from the biological treatment tank. On the contrary, in the magnetic separation type biological activated carbon treatment method according to the invention, the magnetic separator is placed at an outlet of purified water from the biological treatment tank; thus, such structure leads to a processing power with a flow rate of about 10-20 cm/s. The capacity of the treatment tank may be determined in such a way that the dwell time of water in the treatment tank is about 10 minutes. Accordingly, the magnetic separation type biological activated carbon treatment method according to the invention may lead to very high processing speed, reduced size of a system (one tenths relative to a conventional system for example), and low cost relative to a conventional biological activated carbon treatment method.

Figure 7:
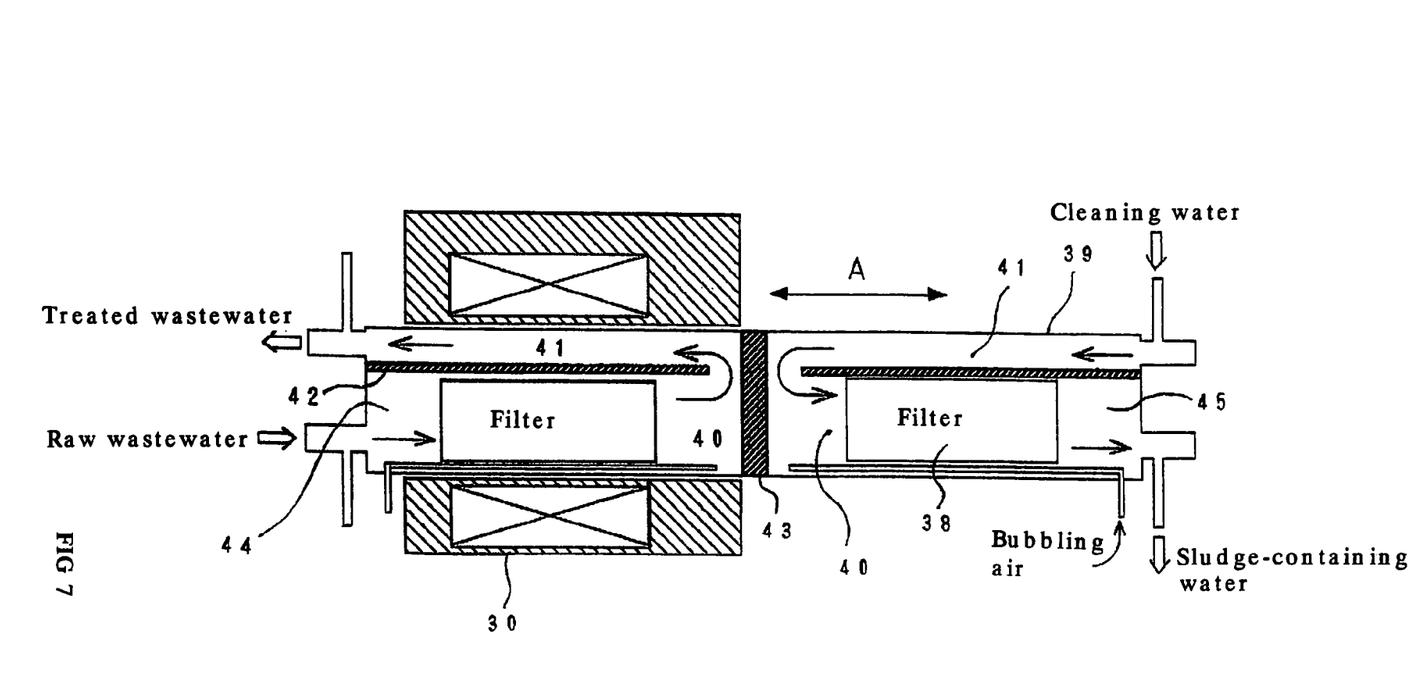
FIG. 7 is a schematic illustration of a switchback-type superconducting magnetic separator according to the invention.

FIG. 7 illustrates a switchback-type magnetic separator according to the invention. The nonmagnetic or weakly magnetic tubular container 39 is partitioned at the center into two chambers 44 and 45 by a partition plate 43. Each chamber 44, 45 is divided into a forward passage section 40 and a backward passage section 41 by a separating wall 42. Each forward passage section 40 is provided with a magnetic filter 38. As the magnetic filter 38, it is possible to optionally adopt a built-up type multiunit magnetic filter composed of a plurality of single-unit magnetic filters, an integrated-type magnetic filter or the like. The entire tubular container 39 can be moved in the longitudinal direction indicated by an arrow A in a bore of the superconducting magnet 30 by any suitable driving means (not shown). Each chamber 44, 45 is provided with an inlet of raw wastewater and an outlet of treated wastewater. The wastewater from the inlet is passed through the magnetic filter 38 disposed in the forward passage section 40 for filtration, and is passed through the backward passage section 41 to discharge it from the outlet. By proper operation of valves (not shown), the inflow of the raw wastewater into one chamber can be stopped so as to enable the inflow into the other chamber. After moving one chamber to the outside of the magnetic field, proper operation of valves (not shown) makes it possible to feed cleaning water from the outlet through the backward passage section 41 to the forward passage section 40 for backwashing the magnetic filter 38, and to discharge sludge-containing water from the inlet after washing. Bubbling air supply pipes are provided near the magnetic filter 38 for enhancing washing power.

In the case of such switchback-type magnetic separator, if it is required to wash one magnetic filter in use, the container 39 housing the magnetic filter is moved by a driving means to pull the magnetic filter out of the superconducting magnet 30 for backwashing, and to position the other magnetic filter in the bore of the superconducting magnet for filtration. During the filtration, the magnetic filter that has been used is backwashed. In this way, the magnetic filter may be switched for alternate use in such a manner that while one magnetic filter is used for filtration, the other magnetic filter can be washed; thus, it is highly efficient. Further, the magnetic filters in themselves are disposed in the closed container, so that even when the filter captures bacterium such as *Escherichia coli* 0157 or toxic substances such as endocrine disrupting chemicals, it is possible to take out them after necessary treatment.

Figure 8:
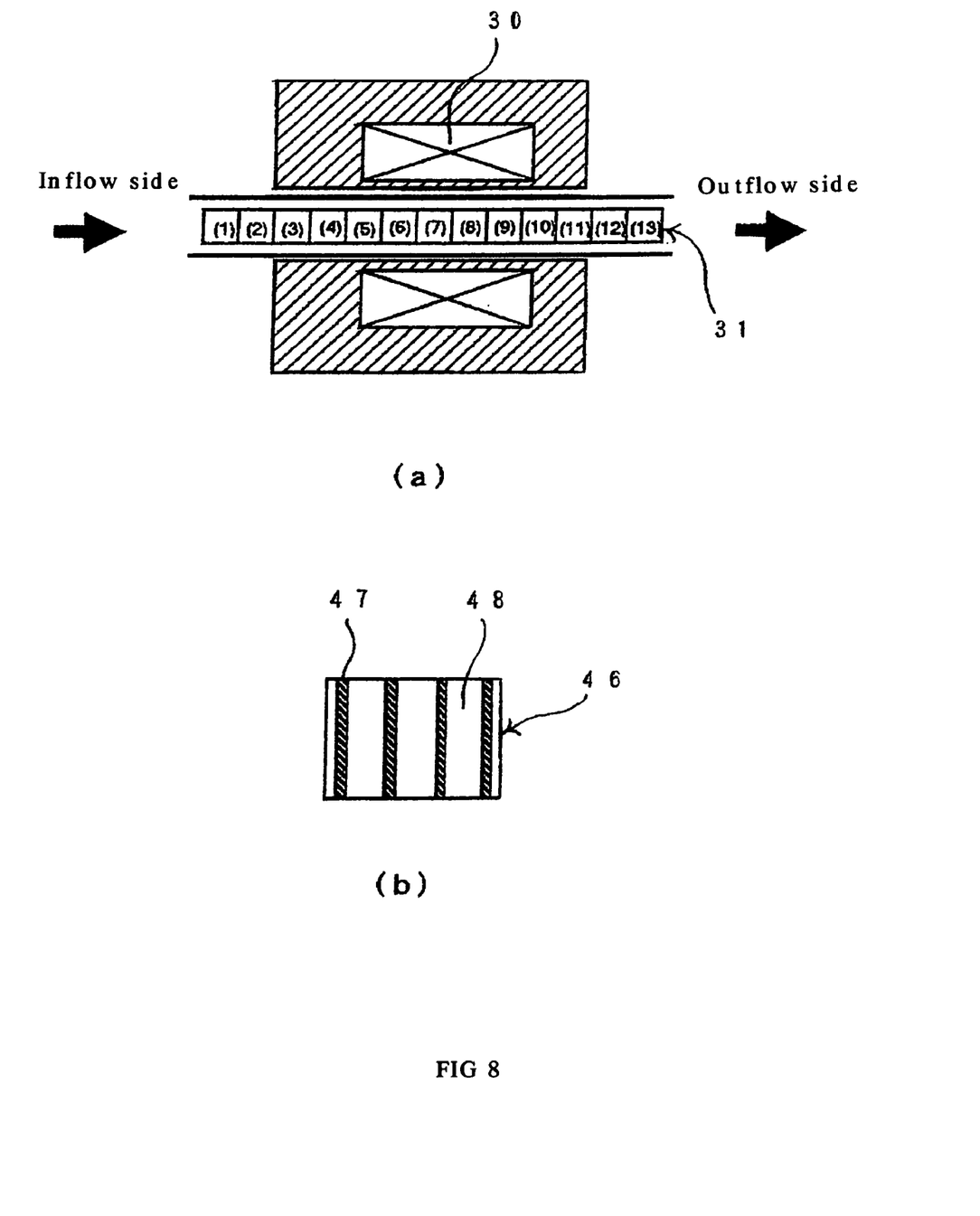
FIG. 8 is an illustration of the experiment of magnetic separation which was carried out using a multiunit magnetic filter according to the invention, wherein the used multiunit magnetic filter is composed of 13 magnetic filter cassettes (FIG. 8(a)), and each magnetic filter cassette is a built-up one made of 4 magnetic filters (FIG. 8(b)).

FIG. 8 illustrates the configuration of the experiments of magnetic separation that were carried out by the multiunit magnetic filter according to the invention. As shown in FIG. 8(a), the built-up multiunit magnetic filter 31 is composed of 13 magnetic filter cassettes 46 (indicated by (1), (2) ... (13) respectively from the inflow side). As shown in FIG. 8(b), each magnetic filter cassette 46 is composed of 4 magnetic filters 47, and spacers 48 having a width of 1 cm are disposed between respective magnetic filters 47.

(Experiment 1)

The magnetic field of 3 T was generated by the superconducting magnet 30, and water of 10 liters to which magnetite ("ISETITE") of 50 g was added (i.e. the concentration of 5% by weight) was passed through from the upstream side at a flow rate of 800 ton/day (i.e. 8 cm/s) for filtration. After the filtration, the magnetic field was reduced for carefully removing the magnetic filter cassettes, and the amount of the magnetite attached to the respective cassettes was measured. The results are shown in TABLE 1. As seen from TABLE 1, more amount of magnetite was captured by a magnetic filter cassette positioned at nearer to the upstream side, and about 70% of the magnetite was recovered by the cassettes (1) and (2).

TABLE 1

| Cassette No. | Captured magnetite (g) | Percentage (%) |
| --- | --- | --- |
| (1) | 18.3456 | 36.7 |
| (2) | 17.4468 | 34.9 |
| (3) | 3.2045 | 6.4 |
| (4) | 1.3614 | 2.7 |
| (5) | 0.6354 | 1.3 |
| (6) | 0.3211 | 0.6 |
| (7) | 0.1432 | 0.3 |
| (8) | 0.0933 | 0.2 |
| (9) | 0.0710 | 0.1 |
| (10) | 0.0530 | 0.1 |
| (11) | 0.0359 | 0.1 |
| (12) | 0.0204 | 0.0 |
| (13) | 0 | 0.0 |
| total | 41.7599 | 83.5 |

(Experiment 2)

Similarly to the experiment 1, the magnetic field of 3 T was generated by the superconducting magnet, and magnetite-containing water was passed through for filtration. After filtration, without reducing the magnetic field, a total of 7 cassettes were pushed in one by one from the downstream side to sequentially take out the cassettes (1)-(7) from the upstream side, and the amount of magnetite was measured. The results are shown in TABLE 2. As seen from TABLE 2, the amounts of magnetite captured by the cassettes (1)-(7) are approximately the same as those of the experiment 1, and about 70% of the magnetite could be recovered by the cassettes (1) and (2) positioned at the upstream side. This indicates that even during excitation of the superconducting magnet, the magnetite attached to the magnetic cassettes can be successfully separated and removed without attachment of the magnetite to the superconducting magnet.

TABLE 2

| Cassette No. | Captured magnetite (g) | Percentage (%) |
|---|---|---|
| (1) | 18.8518 | 37.7 |
| (2) | 18.5678 | 37.1 |
| (3) | 3.1032 | 6.2 |
| (4) | 1.3784 | 2.8 |
| (5) | 0.6388 | 1.3 |
| (6) | 0.2903 | 0.6 |
| (7) | 0.1609 | 0.3 |
| total | 42.9912 | 86.0 |

The invention claimed is:

1. A wastewater treatment system comprising a magnetism adding means for adding magnetism to material to be separated in wastewater, and a superconducting magnetic separation means for separating the material from the wastewater by collecting the magnetism-added material through the magnetic field generated by a solenoid-type superconducting magnet, wherein:

said superconducting magnetic separation means comprises in a bore of the superconducting magnet a multiunit magnetic filter consisting of a plurality of single-unit magnetic filters that are removably built up, and the multiunit magnetic filter has a longitudinal length at least equal or greater than a longitudinal length of the superconducting magnets;

and wherein the system further comprises a transfer and wash means for removing a single-unit magnetic filter from an upstream side of said multiunit magnetic filter by pushing in another single-unit magnetic filter from a downstream side, and for washing and returning the removed filter to the downstream side again during excitation of the superconducting magnet.

2. The wastewater treatment system as claimed in claim 1, wherein:

said magnetism adding means adds magnetism to the material to be separated by attaching the material in the wastewater to a magnetism-added sorption agent in a treatment tank, and said washing of the single-unit magnetic filters is performed in the treatment tank so that the sorption agent attached to the single-unit magnetic filters may be released and returned directly to the treatment tank.

3. The wastewater treatment system as claimed in claim 2, wherein said sorption agent comprises a microorganism-adhered porous material.

4. The wastewater treatment system as claimed in claim 2, wherein said sorption agent comprises a microorganism-adhered activated carbon.

5. The wastewater treatment system recited in claim 1, wherein:

the magnetism adding means attaches the material to be separated in the wastewater to a magnetism-seeded sorption agent in a treatment tank; and the washing of the single-unit magnetic filters is performed in the treatment tank so that the sorption agent attached to the single-unit magnetic filters may be released and returned directly to the treatment tank.

* * * * *